July 1, 1958 R. P. C. CARCASSONNE-LEDUC 2,841,497
ACTIVATING GRAIN FLOUR WITH MALT FLOUR
Filed Nov. 21, 1951 3 Sheets-Sheet 2
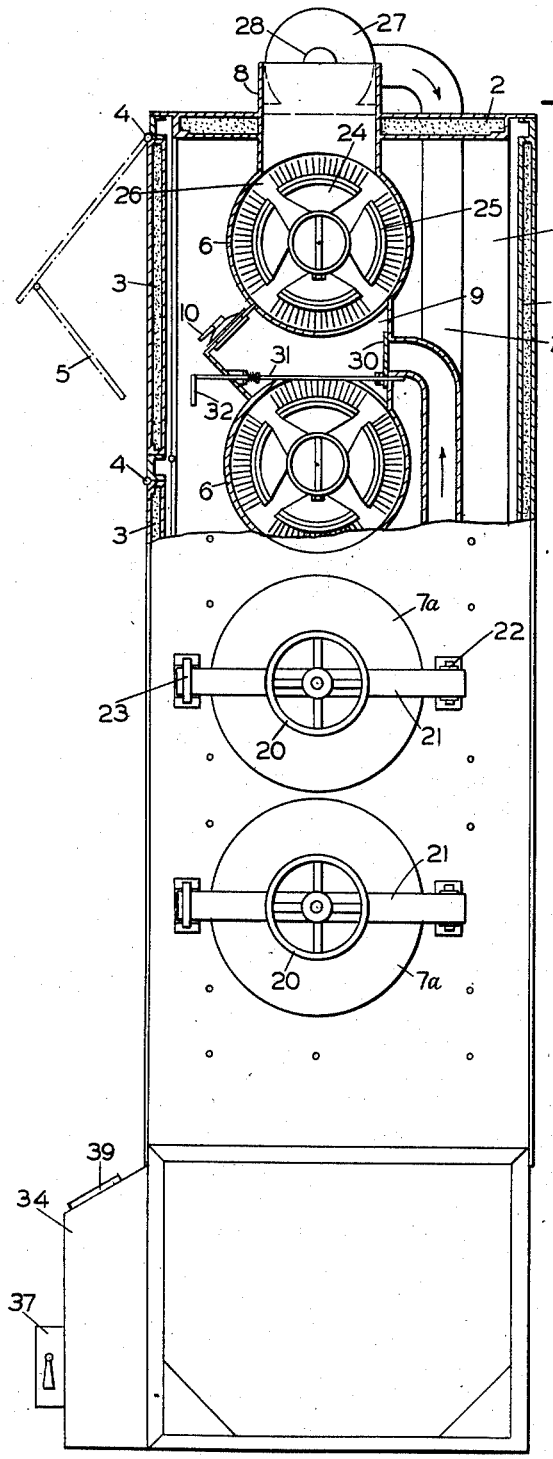
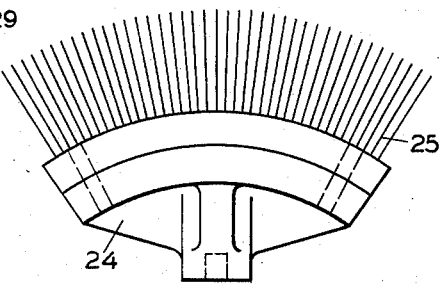
INVENTOR.
ROGER PAUL CHARLES CARCASSONNE-LEDUC
BY
Pollard ay Johnston
ATTORNEYS July 1, 1958    R. P. C. CARCASSONNE-LEDUC    2,841,497
ACTIVATING GRAIN FLOUR WITH MALT FLOUR
Filed Nov. 21, 1951      3 Sheets-Sheet 3
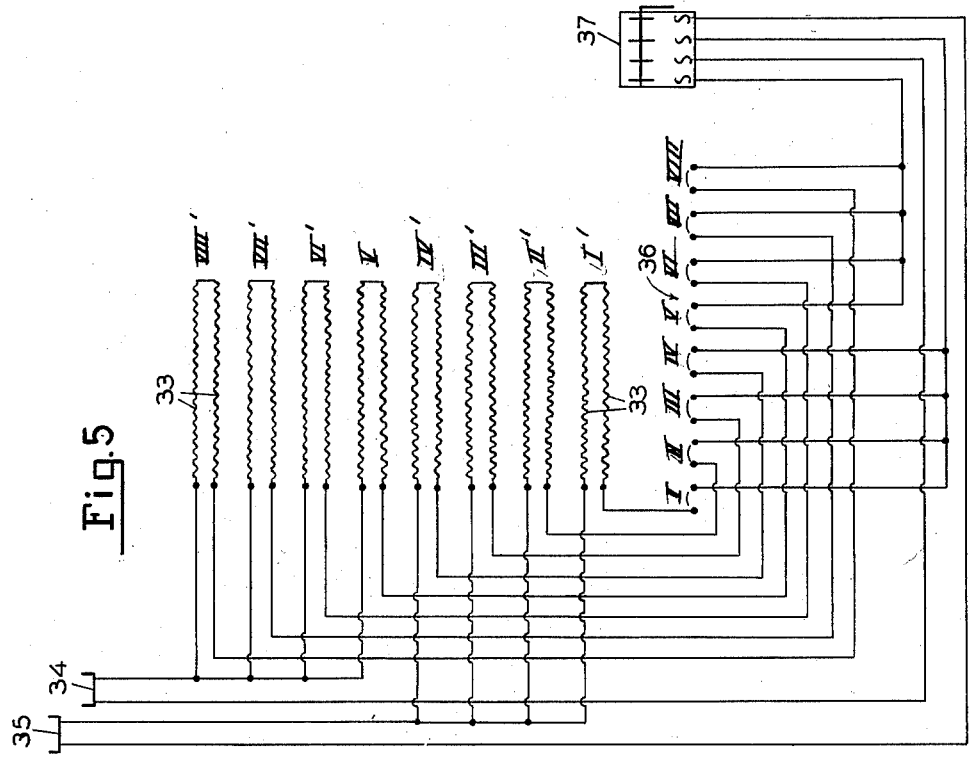
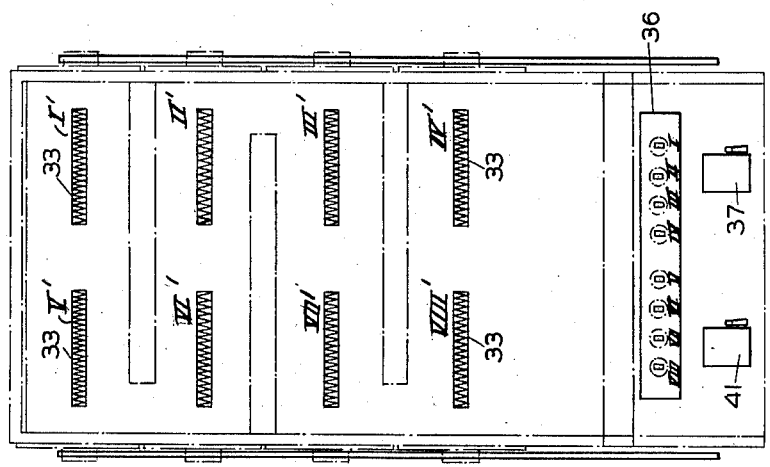
INVENTOR.
ROGER PAUL CHARLES CARCASSONNE-LEDUC
BY Pollard & Johnston
ATTORNEYS

United States Patent Office 2,841,497
Patented July 1, 1958

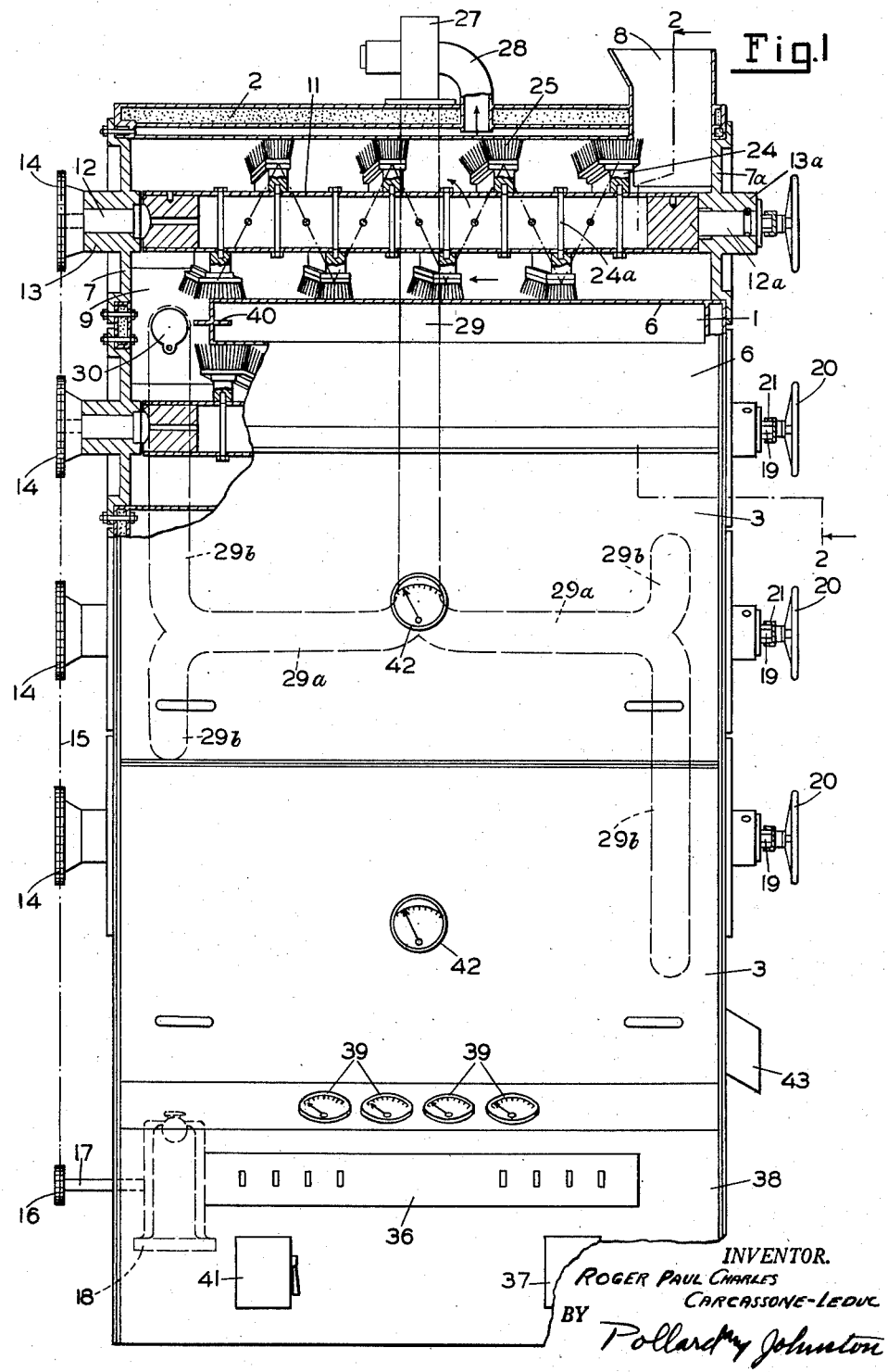

2,841,497

ACTIVATING GRAIN FLOUR WITH MALT FLOUR

Roger Paul Charles Carcassonne-Leduc, Paris, France, assignor to C-L Processes, Incorporated, Wilmington, Del., a corporation of Delaware Application November 21, 1951, Serial No. 257,478

5 Claims. (Cl. 99—94)

The present invention relates to the treatment of nutritional flours containing starch and particularly cereal and leguminous flours.

As is known, cereals, as well as legumes, must be cooked for use as food, the starch contained therein being digestible only after dextrinization of the starch. There has been considerable work performed in attempting to improve cereals so as to make them capable of more complete assimilation by the digestive system, a complete absorption of starchy foods seldom occurring. It has been found that the use of malted flour improves the absorption. Also, it is known that malted flour can be mixed with edible flours in order to make them more easily assimilable. Such mixed flours have been currently used in the manufacture of various cereals for infant use. Said mixed flours, however, have been merely a mixture of malt flour with a basic flour and the transformation of the basic flour begins only at the time of heating. Merely heating said mixtures of malted flour and basic flour after they have been spread in a thin layer, such as in a biscuit oven, has not resulted in a noticeable improvement of the mixtures. Another problem in the treatment of flour for edible purposes is to prevent loss of vitamins therein during the treating process.

One of the objects of the present invention is to provide an apparatus and method for manufacturing an improved flour having superior nutritional properties when used as a cereal such as in the form of a pap or soft food for infants or invalids.

Another object of the invention is to produce a flour having improved nutritional qualities wherein the vitamin content is not materially affected by the process.

Another object of the invention is to provide a process for treating mixtures of malt and edible flours so as to produce high yields in a short space of time of a flour having improved nutritional qualities.

A still further object of the invention is to provide a method and apparatus for physically transforming a mixture of malted flour and unmalted flour into a predigested flour of a quality superior to that hitherto produced.

In one aspect of the invention, a predetermined quantity of malt flour corresponding to the degree of maltage desired can be mixed with the basic flour. The admixture then is subjected to a mechanical stirring and action accompanied by heating at a predetermined temperature which is followed by a pneumatic stirring by a current of heated air at another predetermined temperature. Preferably, this mechanical and pneumatic stirring is repeated at least twice so that there is a cyclic or alternate mechanical and pneumatic stirring of the mixture at predetermined temperatures. The temperature during the mechanical stirring is maintained higher than that of the warm air used for the pneumatic stirring, the temperatures involved being kept below those at which there would be any serious effect upon the vitamins therein. As a more advanced transformation of the starch contained in the flour is desired, the total time of treatment can be increased as needed.

In one manner of carrying out the invention, a series of substantial horizontal pipes, passageways, or zones can be placed one above the other connected at their ends with vertical pipes, conduits, or zones. A vertical pipe is connected between the exit end of a horizontal pipe and the inlet end of the next pipe therebelow. The horizontal pipes can have therein suitable shafts with radiating brushes arranged in an helical pattern, there being free space between the brushes. The horizontal pipes can be heated in any suitable manner, for example, electrical resistances suitably thermostatically controlled being employed for maintaining the same at a predetermined temperature range. As the mixture passes along a horizontal pipe under the influence of the rotating helically arranged brushes, there will be an intimate mechanical mixture while heat is being applied thereto. Air under pressure can be fed into the vertical conduits in a manner so as to provide a pneumatic stirring action therein, the air being of a suitable, but lower temperature than in the horizontal pipes.

The resulting product or cereal food is one which has undergone a deep physical transformation which probably is due to the action of the diastases of the malt. It is a dry process and is accomplished rapidly at low temperature, the speed and temperature being such as to conserve the vitamins involved. For example, in a flour prepared according to the cyclic treatment described herein, a portion of the starch is transformed into sugar and the remainder changed in such a way as to permit it to be easily attacked by the digestive juices. In one manner of use as a food, the flour can be made into a pap and thus it will be apparent that a second maltage takes place when the food is prepared for use. It has been shown that this makes the starch of the flour made in accordance with the present invention entirely digestive. Also, the pap is active in the aspect that it apparently digests other starches in the food given to the infant or person.

In addition, the diastases of malt (protease) act upon the albuminous portion of the wheat (gluten) and partially frees from it the polypeptides and the amino-acids, which will tend to make digestion easier and the elements more directly assimilable.

In a still further aspect, the action of the phytase will block or render inactive the phytic acid, and this will make assimilable the iron and calcium contained in the treated flour.

Other objects, advantages, and features of the invention will become apparent from the following description and drawings which are merely exemplary.

Figure 1 is an elevational view with a portion cut away.

Figure 2 is an end view of Figure 1 looking from the right, a portion being cut away.

Figure 3 is an enlarged fragmentary view of a propulsion brush which can be mounted on the rotating shaft.

Figure 4 is a view showing the heating resistances.

Figure 5 is a diagrammatical showing of the electrical connections of the heating installation.

One manner of carrying out the invention will be described. The device may comprise a casing having double walls 2 filled with an insulating material, the face of the front of this casing being made of panels 3 mounted on hinges 4 so that said panels can be opened. One of the panels is shown in its opened position in Fig. 2 in dot dash lines. A supporting rod 5 can be used to hold the panel open.

Four horizontal pipes or passage means defining zones can be arranged in the casing one above the other, said pipe being closed by end plugs 7 and 7a (Fig. 1). In upper horizontal pipe 6, a material feed hopper 8 provides a path to the outside of casing 1 through which the fluor to be treated can be fed to the upper pipe. Horizontal pipes 6 communicate with each other thru vertical conduits or zones 9. A vertical conduit is arranged to connect the outlet end of a horizontal pipe or zone with the inlet end of the next lower horizontal pipe. Thus, the path through adjacent horizontal pipes will be in opposite directions. The vertical conduits may have inspection doors 10.

A hollow shaft 11 is rotatably mounted within each of the horizontal pipes 6 and preferably is arranged so that the shaft axis coincides with the center line of its pipe. The shafts 11 have their journals 13 and 13a mounted in end plugs 7 and 7a. A sprocket wheel 14 is located at the end of each trunnion and is connected to each pinion 16 by means of a chain shown diagrammatically at 15. A pinion 16 can be connected on shaft 17 of a speed reducing mechanism 18 mounted on the base of casing 1, said speed reducing mechanism being operated by a motor set on the same base. The end plugs 7a are removable and are kept in place by means of a screw 19 having a handwheel 20 (Figs. 1 and 2), said screw abutting trunnion 12 of a shaft 11 and which engages in a supporting bar 21. Bar 21 can be pivotally mounted at 22 on an outside wall of casing 1, the other end of supporting bar 22 being removably held by bracket 23 carried by the same wall.

On each hollow shaft 11, brushes 25 can be mounted on brush carriers 24, the brush carriers being held on their shaft 11 by bolts 24a traversing the latter. The hairs of the brushes rub against the internal wall of each pipe 6. The brushes are arranged obliquely with reference to the corresponding longitudinal axis of shaft 11 and along the same so as to in effect form an helix interrupted by intervals or spaces 26 within each horizontal pipe 6.

On the upper outside part of casing 1, fan 27 can be mounted, the intake of said fan being attached to pipe 28 taking air from said casing 1. The outlet 29 of the fan 27 may have branches 29a and 29b, each of said branches 29b having its outlet in the vertical conduits 9 furnishing air thereto for the pneumatic stirring zone. There may be a regulating shutter 30 pivotally mounted on rod 31 (Fig. 2), said rod having a handle 32 for adjusting the same.

Along each of the horizontal pipes 6 can be arranged two or more electrical heating resistances 33 schematically shown in Fig. 4. The resistances can be made of a conducting wire which is wound on an insulating rod, the resistances being numbered on Figs. 4 and 5 from I' to VIII'.

The resistances can be arranged alternately on either side of horizontal pipes 6 if desired. The resistances can be regulated by thermostats 34 and 35 acting to control switches 36 indicated schematically in Fig. 5 and numbered from I to VIII corresponding to the resistances they regulate. A master interrupter can be used to permit the simultaneous regulation of all of the resistances.

Switches 36 and 37 can be mounted on a control panel suitably placed on casing 1, this panel likewise holding thermometer dials 39 which can be connected to their respective thermometer bulbs 40 inserted in each vertical conduit or zone 9. A switch 41 for regulating the operation of fan 27 also can be mounted on the panel. Thermometers 42 can be arranged on each fixed panel 3.

The operation of the device now will be described. Heating resistances 33 first are energized by their respective switches and the motor for rotating shafts 11 is started, the direction of rotation being such that brushes 25 rotate so as to tend to create a propulsion movement of the flour toward the opening of each pipe 6 due to the helical arrangement of the brushes. The flour to be treated, previously mixed in predetermined quantities with malt fluor to produce the desired "activated flour," is introduced by hopper 8 to upper horizontal pipe 6. The mixture is gradually moved in the pipe 6 by brushes 25 toward the left (Fig. 1) or the end opposite to hopper 8. At the same time, the admixture is subjected to a vigorous mechanical stirring and action. During this movement, the flour admixture is heated by resistances 33 by conduction through the walls of pipe 6, thermostats 34 and 35 being adjusted to maintain a temperature in the interior of the pipe in the range of 50° to 80° C. and preferably not above 70° C. When the mixture passing through the center thereof reaches the end of pipe 6 opposite to hopper 8, it falls freely into corresponding conduit 9 in which it is stirred pneumatically by air furnished by fan 27. The mixture normally is at a level in the pipe substantially higher than the horizontal plane through the center line of the pipe. The air is furnished through conduit 29b, shutter 30 having been opened for this purpose. Experience shows that when the above-mentioned temperatures are used, the temperature of the air taken from the casing by conduit 28 and fed by fan 27 to vertical conduit 9 is in the range from 30° to 50°. Thus, it can be seen that the temperature prevailing in vertical conduits 9 will be about 20° below that in horizontal pipe 6. From vertical conduit 9, the mixture falls into the next lower horizontal pipe 6 where it is acted upon by the brushes which rotate in the latter and where the mixture undergoes a new mechanical stirring and treatment accompanied by a heating at 50–70° C. Then the mixture falls into the next vertical conduit 9. This cyclic repetition of treatment in the various zones takes place to the point where the mixture escapes through a neck 43 attached to the last vertical conduit 9 which follows the lowermost horizontal pipe 6.

The flour mixture therefore is subjected alternately to a series of treating cycles comprising mechanical stirring and action accompanied by heating at a temperature of 50° to 70°, followed by pneumatic stirring by means of air at a lower temperature ranging from 30° to 50° C., each stirring taking place in a separate zone. The mechanical action may be such that it acts on the starch granules in conjunction with the heating and the other steps of the process in a manner such as to effect the predigestion action of the method.

In order to observe the diastasic transformation of the dry process involved here, an apparatus was constructed permitting observation of the process. Apparently the heat in the tubes increases the tension of water vapor normally in the flour (13 to 15% humidity). The air in the cylinder cools off with expansion and lowers sharply the temperature of the grains of flour so that a fine film of water condenses thereon. At this time the temperature is from 40–45° C. which is an ideal thermic condition for the amylase action.

As an example, wheat flour containing 61% starch was treated in an apparatus such as the one described above. Into this flour was mixed in the supply hopper, a quantity of malt flour corresponding to the introduction of 10% of diastases in the treated flour, the quantity of mixture introduced being 100 kilos per hour. The time the mixture stayed in the apparatus was about 20 minutes and the heating was conducted so as to reach in the horizontal pipes a temperature of about 60° C., the air taken from casing 1 and blown by fan 27 in the vertical conduits 9 then being at a temperature comprised between 50° C. in the first vertical conduit and 35° C. in the second vertical conduit. The flour obtained when coming out of the apparatus contained a quantity of 10% sugars directly assimilable with an important predominance of maltose. By bringing up to 20% the proportion of diastases added and by treating the above mentioned flour under the same conditions for about 25 minutes, a flour was obtained containing more than 20% of sugars directly assimilable.

Also, when barley, corn and oat flours have been used, the results have been similar. It can be theorized that in the cyclic treatment in the temperature ranges mentioned herein, the grain of starch apparently undergoes a deep transformation. It is a physical process assuring homogenization of the product, which maintains the fixed ratio of malt and transforms the two elements into a new product much further advanced in digestion than that obtained by the usual maltage by cooking or by industrial maltage. The reaction to the iodine test, raw or slightly cooked, one or two minutes of cooking being sufficient, gives a purple color indication. This is in contrast with the blue coloration, which indicates the presence of starch, in the case of ordinary malted flour. The vitamins have been found preserved and there appears to be an almost complete utilization of the amylaceous substances.

The flours treated according to the invention are eminently digestible and they have been found to be remarkably suitable for making pap or porridge for infant diets and can be used advantageously in biscuit manufacture. When used in making bread, it was found that the baker did not have to change his regular technique. It has been found that a 20% mixture of the flour of the present invention with regular flour can be prepared and used to advantage for bread making. In addition to other properties, it was found that the bread could be stored in a dry place for several months.

The process and device conforming to the invention permits flours reputed to be unsuitable for bread making, to be made suitable and increases considerably the qualities of bread made therefrom and the yield of flours suitable for bread-making.

Details of the invention, of course, can be varied without departing from the spirit of the invention except as defined in the appended claims.

What is claimed is:

1. The method of physically transforming a mixture of flours comprising the steps of mixing a predetermined quantity of malt flour with grain flour having atmospheric moisture therein, subjecting the mixture of malt flour and flour to mechanical stirring in a zone while subjected to heat at a temperature above that at which most effective diastatic transformation of the starch will occur but below that at which the vitamin content will be destroyed, until intimate contact between the particles of the flour is obtained, then cooling and pneumatically stirring the resulting mass of particles in another zone to a lower temperature providing effective conditions for diastatic action by contact with an atmosphere containing water vapor, again repeating said mechanical stirring and said pneumatic stirring steps to complete the desired degree of transformation.

2. The method of activating a mixture of flours comprising the steps of mixing a predetermined quantity of malt flour with a grain flour containing atmospheric moisture in accordance with the degree of maltage desired, and subjecting said mixture to a cycle including treatment in alternate zones by a mechanical stirring while subjected to heat at a temperature above that at which most effective diastatic transformation of the starch will occur but below at which the vitamin content will be destroyed and then cooling and pneumatically and mechanically stirring the resulting mass by means of air under pressure in another zone to a lower temperature providing effective conditions for diastatic action, said air containing atmospheric moisture, said cycle being carried out at least twice.

3. The method of activating a mixture of flours comprising the steps of mixing a predetermined quantity of malt flour with a grain flour containing atmospheric moisture in accordance with the degree of maltage desired, and subjecting said mixture to a mechanical stirring while subjected to heat in the range 50–80° in one zone, and then cooling and stirring the resulting hot mass of particles in another zone by means of warm compressed air containing water vapor introduced through the mass thereby maintaining the particles at a temperature in the range 30–50° C., and subjecting said mixture to a further similar mechanical stirring zone and stirring in another zone by air.

4. The method of activating a mixture of flours comprising the steps of mixing a predetermined quantity of malt flour and grain flour having atmospheric moisture therein, the proportions being selected to provide the desired maltage, passing said mixture horizontally through a heated first zone wherein there is an interrupted helical mechanical stirring and heat is applied at a temperature above that at which most effective diastatic transformation of the starch will occur but below that at which the vitamin content will be destroyed, passing said mixture from said first zone through a heated vertical second zone containing water vapor in the atmosphere, the temperature of said second zone being maintained lower than that of the first zone within the range 30–50° C., further passing said flour through a heated third zone having interrupted helical mechanical stirring, and passing the mixture through a heated fourth zone having pneumatic stirring at said lower temperature by means of an atmosphere containing water vapor, so as to produce the desired physical transformation of said mixture.

5. The method of physically transforming and activating a mixture of malt and edible grain flours comprising the steps of mixing a predetermined quantity of malt flour with the edible flour to produce the desired maltage, subjecting the mixture containing atmospheric moisture to a mechanical action and propelling in a zone maintained at a predetermined temperature above that at which most effective diastatic transformation of the starch will occur but which is below that at which vitamins are destroyed, and then passing the mixture to and through a free fall zone containing water vapor and maintained at a temperature lower than said predetermined temperature, thus providing effective conditions for diastatic action, said mixture being subjected to pneumatic mixing and diastatic action as it falls through said zone.

References Cited in the file of this patent

UNITED STATES PATENTS

| | | |
|---|---|---|
| 305,142 | Burckhardt | Sept. 16, 1884 |
| 517,479 | Onderdonk | Apr. 3, 1894 |
| 954,033 | Kiser | Apr. 5, 1910 |
| 1,234,662 | Herendeen | July 24, 1917 |
| 1,713,537 | Kux | May 21, 1929 |
| 1,950,418 | Schreier | Mar. 13, 1934 |
| 1,993,264 | Duttweiler | Mar. 5, 1935 |
| 2,100,150 | Randolph | Jan. 30, 1936 |
| 2,197,784 | Bauer | Apr. 23, 1940 |
| 2,291,529 | Carbon | July 28, 1942 |
| 2,295,918 | Thomas | Sept. 15, 1942 |